United States Patent
Hayashi

(10) Patent No.: US 9,283,814 B2
(45) Date of Patent: Mar. 15, 2016

(54) PNEUMATIC TIRE

(71) Applicant: SUMITOMO RUBBER INDUSTRIES, LTD., Kobe-shi, Hyogo (JP)

(72) Inventor: Koji Hayashi, Kobe (JP)

(73) Assignee: SUMITOMO RUBBER INDUSTRIES, LTD., Kobe-Shi (JP)

(*) Notice: Subject to any disclaimer, the term of this patent is extended or adjusted under 35 U.S.C. 154(b) by 571 days.

(21) Appl. No.: 13/730,179

(22) Filed: Dec. 28, 2012

(65) Prior Publication Data

US 2013/0167997 A1 Jul. 4, 2013

(30) Foreign Application Priority Data

Dec. 29, 2011 (JP) .................... 2011-290324

(51) Int. Cl.
*B60C 11/04* (2006.01)
*B60C 11/12* (2006.01)
*B60C 11/03* (2006.01)

(52) U.S. Cl.
CPC ............ *B60C 11/04* (2013.01); *B60C 11/0306* (2013.04); *B60C 11/1263* (2013.04); *B60C 11/12* (2013.01); *B60C 11/1236* (2013.04); *B60C 11/1259* (2013.04); *B60C 2011/039* (2013.04); *B60C 2011/0353* (2013.04);
(Continued)

(58) Field of Classification Search
CPC .. B60C 11/04; B60C 11/047; B60C 11/1263; B60C 2011/0381; B60C 2011/0353; B60C 2011/0383; B60C 2011/0388; B60C 2011/036
USPC ........................ 152/209.18, DIG. 3
See application file for complete search history.

(56) References Cited

U.S. PATENT DOCUMENTS 3,023,798 A * 3/1962 Moore et al. ............... 152/209.3
3,897,813 A * 8/1975 Verdier .................... 152/209.18
(Continued)

FOREIGN PATENT DOCUMENTS

DE 102012201631 A1 * 8/2012 .............. B60C 11/03
JP 08072510 A * 3/1996 .............. B60C 11/12
JP 2006347346 A * 12/2006 .............. B60C 11/12

OTHER PUBLICATIONS

Machine Translation: JP 2006347346 A; Watanabe, Nobuyuki; no date.*

(Continued)

*Primary Examiner* — Steven D Maki
*Assistant Examiner* — Kendra Ly
(74) *Attorney, Agent, or Firm* — Birch, Stewart, Kolasch & Birch, LLP

(57) ABSTRACT

A pneumatic tire has a tread portion divided into a crown rib, a pair of middle ribs and a pair of shoulder ribs by two crown main grooves and two shoulder main grooves. The width of the crown main groove is 5.5 to 7.5% of the tread width. The width of the shoulder main groove is 50 to 70% of the crown main groove width. The crown rib has crown sipes extending from the crown main grooves. The middle rib has axially inner middle sipes extending axially outward from the crown main groove and ending within the middle rib, and axially outer middle sipes extending axially inward from the shoulder main groove and ending within the middle rib. The shoulder rib has shoulder sipes extending axially outward from the shoulder main groove, and shoulder lug grooves extending axially inward from the tread edge ending within the shoulder rib.

4 Claims, 4 Drawing Sheets

(52) U.S. Cl.
CPC .................. *B60C 2011/0381* (2013.04); *B60C 2011/0383* (2013.04); *B60C 2011/0386* (2013.04); *B60C 2011/0388* (2013.04)

(56) References Cited

U.S. PATENT DOCUMENTS

| | | | |
|---|---|---|---|
| 4,449,560 A * | 5/1984 | Tansei et al. | 152/209.23 |
| 6,196,288 B1 * | 3/2001 | Radulescu et al. | 152/209.17 |
| 7,207,364 B2 * | 4/2007 | Hildebrand | 152/209.18 |
| 2005/0269004 A1 | 12/2005 | Miyabe et al. | |
| 2006/0137791 A1 * | 6/2006 | Miyabe et al. | 152/209.18 |
| 2010/0314012 A1 * | 12/2010 | Hada | 152/209.16 |

OTHER PUBLICATIONS

Machine Translation: JP 08072510 A; Idei et al.; no date.*

* cited by examiner

PNEUMATIC TIRE

BACKGROUND OF THE INVENTION

The present invention relates to a pneumatic tire, more particularly to a rib-based tread pattern capable of improving the drainage performance while maintaining the uneven wear resistance and noise performance of the tire.

In general, a pneumatic tire is provided in the tread portion with circumferentially continuously extending main grooves to remove water existing between the tread and road surface toward the outside of the ground contacting patch of the tire.

In order to improve the drainage performance, if wide straight main grooves are provided in the tread portion, so called air column resonance which deteriorates the noise performance of the tire is likely to occur during running. In addition, since the ground contacting area is decreased by the wide main grooves, the rigidity of the tread portion is decreased, and the uneven wear resistance of the tread portion tends to deteriorate.

SUMMARY OF THE INVENTION

It is therefore, an object of the present invention to provide a pneumatic tire, in which the drainage performance can be improved without sacrificing the noise performance and uneven wear resistance of the tire.

According to the present invention, a pneumatic tire comprises
  a tread portion provided on each side of the tire equator with an axially inner crown main groove and an axially outer shoulder main groove each extending continuously in the tire circumferential direction so as to axially divide the tread portion into a crown rib between the crown main grooves, a pair of middle ribs between the crown main grooves and the shoulder main grooves, and a pair of shoulder ribs between the shoulder main grooves and tread edges,
wherein
  the crown main grooves have a width of from 5.5 to 7.5% of a tread width between the tread edges,
  the shoulder main grooves have a width of from 50 to 70% of the width of the crown main grooves,
  the crown rib is provided with leftward crown sipes which are defined as extending from one of the crown main grooves toward the tire equator, and rightward crown sipes which are defined as extending from the other crown main groove toward the tire equator,
  the middle ribs are each provided with axially inner middle sipes and axially outer middle sipes, the axially inner middle sipes extending axially outward from the adjacent crown main groove and terminating within the middle rib, and the axially outer middle sipes extending axially inward from the adjacent shoulder main groove and terminating within the middle rib,
  the shoulder ribs are each provided with shoulder sipes and shoulder lug grooves, the shoulder sipes extending axially outward from the adjacent shoulder main groove, and the shoulder lug grooves extending axially inward from the tread edge and terminating within the shoulder rib, and
  only connected with the crown main grooves and the shoulder main grooves are the leftward and rightward crown sipes, the axially inner and axially outer middle sipes and the shoulder sipes.

Therefore, the crown main grooves and the shoulder main grooves can smoothly drain water existing between the tread and the road surface toward the tire circumferential direction, thereby improving drainage performance. Especially, the crown main grooves are relatively wide, therefore, the drainage in the tread crown region can be significantly improved. Meanwhile, the shoulder main grooves are relatively narrow, therefore, the rigidity of the tread shoulder region can be maintained while effectively suppressing the occurrence of air column resonance having great influence on pass-by noise. Thus, the noise performance and uneven wear resistance can be improved.

The crown sipes absorb water existing between the crown rib and the road surface and serve as edge components while maintaining rigidity of the crown rib, thereby improving drainage performance and uneven wear resistance. Similarly, the axially inner middle sipes, the axially outer middle sipes and the shoulder sipes can improve wet performance and uneven wear resistance. The shoulder lateral grooves can smoothly guide water existing between the shoulder ribs and the road surface outward in the axial direction, thereby significantly improving drainage performance.

According to the present invention, communicated with the crown main grooves and the shoulder main grooves are only the very narrow sipes. That is to say, relatively wide lateral grooves are not communicated. Accordingly, the crown rib, the middle ribs and the shoulder ribs are increased in the circumferential rigidity, thereby improving uneven wear performance. Further, since there is no air flow from wide lateral grooves into the main grooves, excitation of air in the main grooves is significantly reduced, and the occurrence of the air column resonance noise can be effectively prevented.

The pneumatic tire according to the present invention may be further provided with the following features:
(1) when an edge density of the crown rib is defined as the total sum of the axial components of the lengths of one of the leftward crown sipes and one of the rightward crown sipes which is divided by the axial width of the crown rib,
an edge density of each middle rib is defined as the total sum of the axial components of the lengths of one of the axially inner middle sipes and one of the axially outer middle sipes which is divided by the axial width of the middle rib, and
an edge density of each shoulder rib is defined as the total sum of the axial components of the lengths of one of the shoulder sipes and one of the lug grooves which is divided by the axial width of the shoulder rib,
the edge density of the crown rib is smallest and the edge density of the shoulder rib is largest;
(2) the axially inner middle sipes are inclined at an angle of from 40 to 70 degrees with respect to the tire circumferential direction, and
  the axially outer middle sipes are inclined at an angle of from 40 to 70 degrees with respect to the tire circumferential direction; and
(3) in each of the middle ribs, each of the axially outer middle sipes has its axially inner end at an axial distance of from 10 to 40% of the axial width of the middle rib, from the adjacent crown main groove, and
  toward the axially outside from said axially inner end, the depth of the axially outer middle sipe is gradually increased to form a deepest portion having a maximum depth, then the depth is decreased to form a shallow portion of which depth is less than the maximum depth, and again the depth is increased to form a communicating portion continued to the shoulder main groove and being deeper than the shallow portion.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure is uniformly defined by 180 kPa.

The tread edges $2t$ are the axial outermost edges of the ground contacting patch (camber angle=0) in the normally inflated loaded condition.

The tread width TW is the axial distance between the tread edges measured in the normally inflated unloaded condition of the tire.

Incidentally, the sipe is as well known in the art, a very narrow groove or slit. In this application, the term "sipe" means a groove whose width is at most 2 mm, usually 1.5 mm or less. The term "groove" means that having a width of more than 2 mm.

DESCRIPTION OF THE PREFERRED EMBODIMENTS

Figure 1:
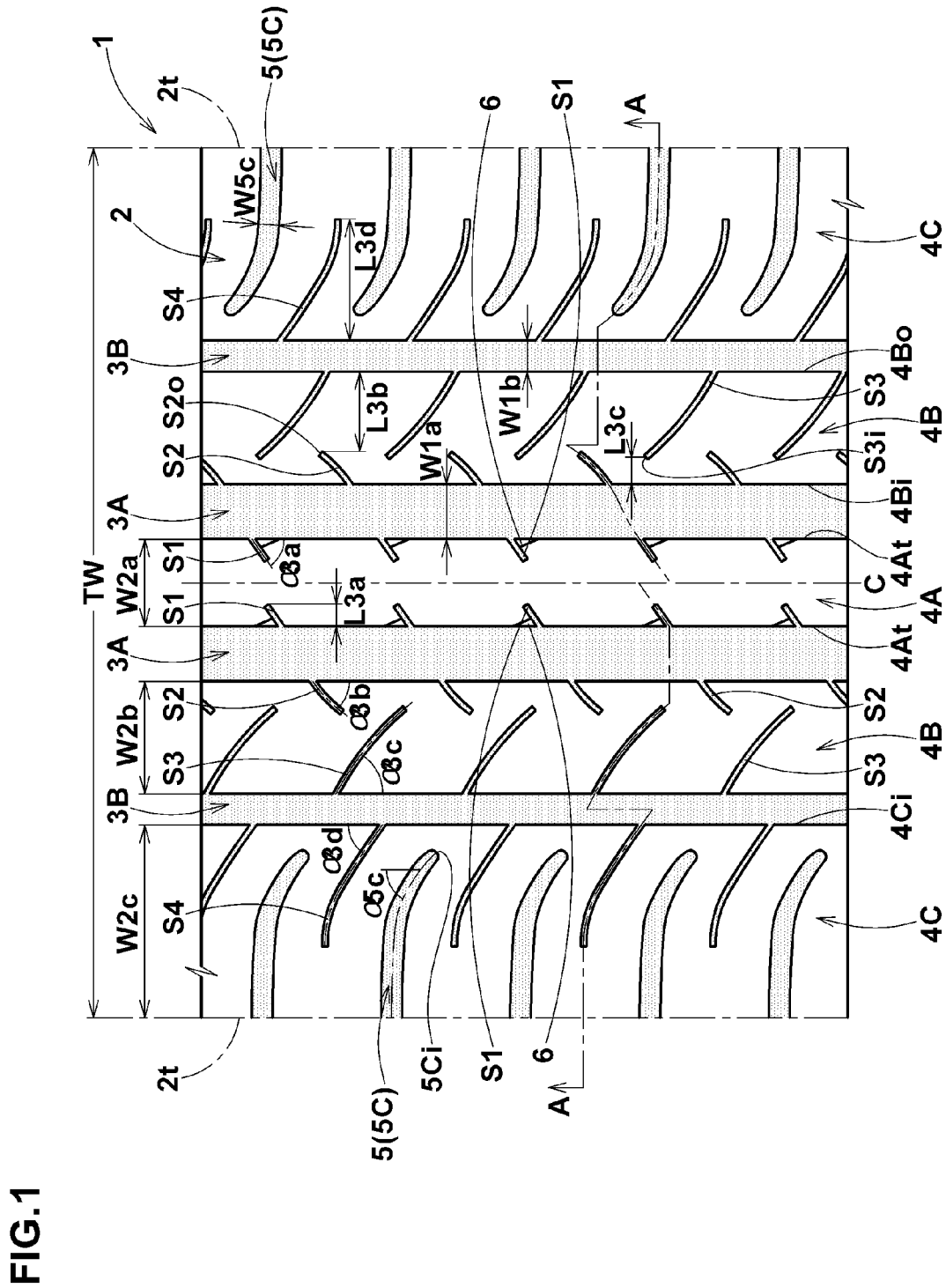
FIG. 1 is a partial plan view of a pneumatic tire as an embodiment of the present invention showing a tread patter.
Figure 2:
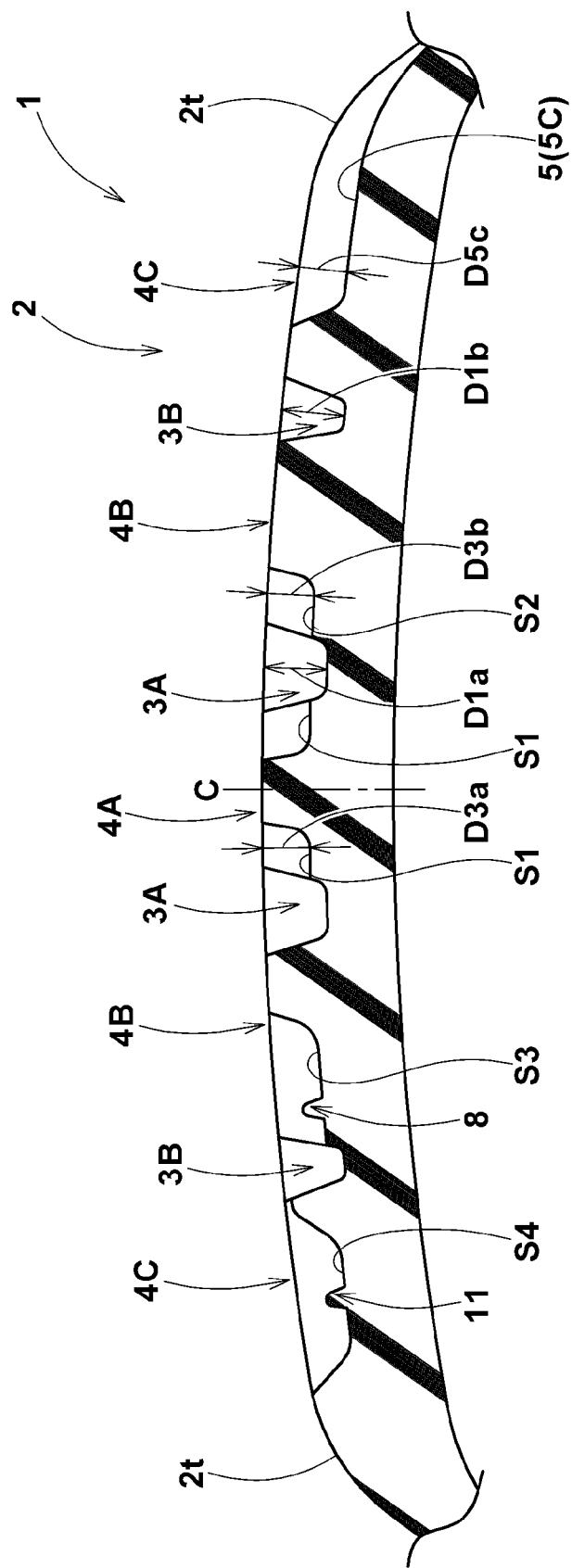
FIG. 2 is a cross sectional view of the tread portion taken along line A-A of FIG. 1.

Embodiments of the present invention will now be described in detail in conjunction with accompanying drawings.

In the drawings, pneumatic tire 1 according to the present invention is a passenger car radial tire.

As usual, the tire 1 comprises a tread portion 2, a pair of axially spaced bead portions each with a bead core therein, a pair of sidewall portions extending between the tread edges $2t$ and the bead portions, a carcass extending between the bead portions, and a tread reinforcing belt disposed radially outside the carcass in the tread portion.

The tread portion 2 is provided with four circumferentially continuously extending main grooves which are a pair of crown main grooves 3A disposed one on each side of the tire equator C, and a pair of shoulder main grooves 3B disposed axially outside the respective crown main grooves 3A. The tread portion 2 is therefore axially divided into a crown rib 4A defined between the crown main grooves 3A, a pair of middle ribs 4B defined between the crown main grooves 3A and the shoulder main grooves 3B, and a pair of shoulder ribs 4C defined between the shoulder main grooves 3B and the tread edges $2t$.

Each of the crown main grooves 3A and the shoulder main grooves 3B is a straight groove whose each edge extends on a straight circumferential line. Such straight groove can smoothly drain water existing between the tread and the road surface towards the tire circumferential direction during straight running and cornering, thereby the drainage performance can be improved.

The depths $D1a$ and $D1b$ of the main grooves 3A and 3B are preferably set in a range of from 3 to 6% of the tread width TW. The width $W1a$ of the crown main groove 3A is set in a range of from 5.5 to 7.5% of the tread width TW. Such wide crown main grooves 3A can significantly improve the drainage near the tire equator C. If the width $W1a$ of the crown main groove 3A is less than 5.5% of the tread width TW, the crown main grooves 3A may not sufficiently improve drainage performance. In contrast, if the groove width $W1a$ exceeds 7.5% of the tread width TW, there is a possibility that the rigidity of the tread portion 2 is decreased and the air column resonance occurs, thereby the uneven wear resistance and noise performance are deteriorated. From this point of view, the groove width $W1a$ is more preferably 6.0% or more of the tread width TW, and 7.0% or less of the tread width TW.

Meanwhile, the shoulder main grooves 3B have a width $W1b$ smaller than the width $W1a$ of the crown main grooves 3A. This can effectively suppress the occurrence of air column resonance in the shoulder main grooves 3B having great influence on the pass-by noise, thereby the noise performance can be improved. Further, a decrease in the rigidity of the tread portion 2 in a tread edge side can be avoided, thereby the uneven wear resistance can be improved. To make the foregoing functions more effective, the width $W1b$ of the shoulder main grooves 3B is preferably set in a range of from 50 to 70% of the width $W1a$ of the crown main grooves 3A.

If the width $W1b$ of the shoulder main grooves 3B exceeds 70% of the width $W1a$ of the crown main grooves 3A, the shoulder main grooves 3B may not sufficiently improve the noise performance and uneven wear resistance described above. In contrast, if the width $W1b$ of the shoulder main grooves 3B is less than 50% of the width $W1a$ of the crown main grooves 3A, the width $W1b$ of the shoulder main grooves 3B becomes excessively small, and thus drainage by the shoulder main grooves 3B may be deteriorated.

From this point of view, the width $W1b$ of the shoulder main grooves 3B is more preferably 65% or less, and 55% or more of the width $W1a$ of the crown main grooves 3A.

The crown main grooves 3A and the shoulder main grooves 3B are communicated with only sipes S1, S2, S3 and S4. Accordingly, the main grooves 3A and 3B can suppress excitation of their air columns resulting from inflow of air from wide lateral grooves, thereby improving noise performance. In addition, the crown rib 4A, the middle ribs 4B and the shoulder ribs 4C adjacent to the crown main grooves 3A and the shoulder main grooves 3B can be effectively increased in the rigidity in the tire circumferential direction, thereby improving uneven wear resistance.

In this embodiment, more specifically, the crown rib 4A is provided with crown sipes S1 arranged at intervals in the tire circumferential direction so to extend toward the tire equator C from the crown main grooves 3A on the both sides thereof. The crown sipes S1 each extend from the crown main groove 3A toward the tire equator C but terminate without reaching the tire equator C. The crown sipes S1 are inclined at an angle α3a of 50 to 70 degrees with respect to the tire circumferential direction. The crown sipes S1 are disposed at both of the edges 4At of the crown rib 4A in a staggered manner in the tire circumferential direction. The crown sipes S1 preferably have a depth D3a of about 5.0 to 7.0 mm. The crown sipes S1 each have an axial length L3a of about 25 to 35% of the axial width W2a of the crown rib 4A.

Such crown sipes S1 can absorb water existing between the crown rib 4A and the road surface and serve as edge components while maintaining rigidity of the crown rib 4A, thereby improving the drainage performance and uneven wear resistance.

Preferably, acute-angled corners between the crown sipes S1 and both of the edges 4At of the crown rib 4A are chamfered by recessing from the crown sipe S1 to the crown main groove 3A. In this embodiment, each chamfered portion 6 has a circumferentially long triangular shape in the plan view. The chamfered portions 6 can effectively suppress damage such as chipping that is apt to occur at the corners, thereby improving uneven wear resistance. In addition, the chamfered portions 6 can cause disturbance in vibration of an air column formed between the crown main groove 3A and the road surface, thereby improving noise performance.

The middle rib 4B is provided with axially inner middle sipes S2 extending axially outward from the crown main groove 3A and axially outer middle sipes S3 extending axially inward from the shoulder main groove 3B. The axially inner middle sipes S2 are arranged at intervals in the tire circumferential direction. The axially outer middle sipes S3 are arranged at intervals in the tire circumferential direction.

In this embodiment, the axially inner middle sipes S2 and the axially outer middle sipes S3 are disposed at the axially inner edge 4Bi and the axially outer edge 4Bo of the middle rib 4B, respectively, in a staggered manner in the tire circumferential direction. The axially inner middle sipes S2 are inclined with respect to the tire circumferential direction, and extend axially outward from the crown main grooves 3A, and terminate without reaching the shoulder main grooves 3B.

Such axially inner middle sipes S2 can absorb water existing between the middle ribs 4B and the road surface and serve as edge components while maintaining rigidity of the middle ribs 4B, thereby improving drainage performance and uneven wear resistance.

The axially inner middle sipes S2 preferably have a depth D3b in the same range as the depth D3a of the crown sipes S1. The axially inner middle sipes S2 each preferably have an axial outer end S2o axially inside the axial width center of the middle rib 4B. Accordingly, the axially inner middle sipes S2 can suppress a decrease in the rigidity in an axially outer edge side of the middle rib 4B which are subjected to a relatively large ground-contact pressure during cornering, thereby effectively improving the uneven wear resistance.

The axial distance L3b between the axially outer end S2o and the axially outer edge 4Bo of the middle rib 4B is preferably about 60 to 85% of the maximum width W2b of the middle rib 4B. The axially inner middle sipes S2 in this embodiment extend axially outward from the crown main groove 3A so as to smoothly and gradually decrease its angle α3b with respect to the tire circumferential direction.

Such axially inner middle sipes S2 can provide axial and circumferential edge components while maintaining the rigidity of the middle ribs 4B, thereby improving the drainage performance and steering stability.

To make the foregoing functions more effective, the angle α3b is preferably set in a range of from 40 to 70 degrees.

If the angle α3b is less than 40 degrees, the axially inner middle sipes S2 may not provide sufficient axial edge components nor sufficiently enhance the drainage performance and steering stability. In contrast, if the angle α3b exceeds 70 degrees, the axially inner middle sipes S2 may not provide sufficient circumferential edge components. From this point of view, the angle α3b is more preferably 45 degrees or more, and 60 degrees or less.

The axially outer middle sipes S3 extend axially inward from the shoulder main groove 3B and terminate without reaching the crown main groove 3A.

Such axially outer middle sipes S3 can improve the drainage performance and uneven wear resistance.

The axially outer middle sipes S3 each preferably have an axially inner end S3i on the axially inside the axial width center of the middle rib 4B. Accordingly, the axially outer middle sipes S3 can absorb water existing between the middle rib 4B and the road surface in an axially wide area and serve as edge components, thereby improving drainage performance. To make the foregoing functions more effective, an axial distance L3c between the axially inner end S3i and the axially inner edge 4Bi of the middle rib 4B is preferably set in a range of from 10 to 40% of the maximum width W2b of the middle rib 4B. If the axial distance L3c exceeds 40% of the maximum width W2b, the axially outer middle sipes S3 may not sufficiently exert the foregoing actions. In contrast, if the axial distance L3c is less than 10% of the maximum width W2b, the middle rib 4B decrease in the rigidity and may not sufficiently maintain the uneven wear resistance.

From this point of view, the axial distance L3c is more preferably 30% or less and 15% or more of the maximum width W2b.

The axially outer middle sipes S3 in this embodiment extend axially inward from the shoulder main groove 3B so as to smoothly and gradually decrease its angle α3c with respect to the tire circumferential direction.

Such axially outer middle sipes S3 can significantly improve wet performance and steering stability. The angle α3c is preferably 40 degrees or more, more preferably 45 degrees or more, and 70 degrees or less, more preferably 65 degrees or less.

With respect to the tire axial direction, the axially outer middle sipes S3 are inclined oppositely to the axially inner middle sipes S2.

Such axially outer middle sipes S3 can provide edge components different in the direction from edge components of the axially inner middle sipes S2, thereby significantly improving the drainage performance and steering stability.

Figure 3:
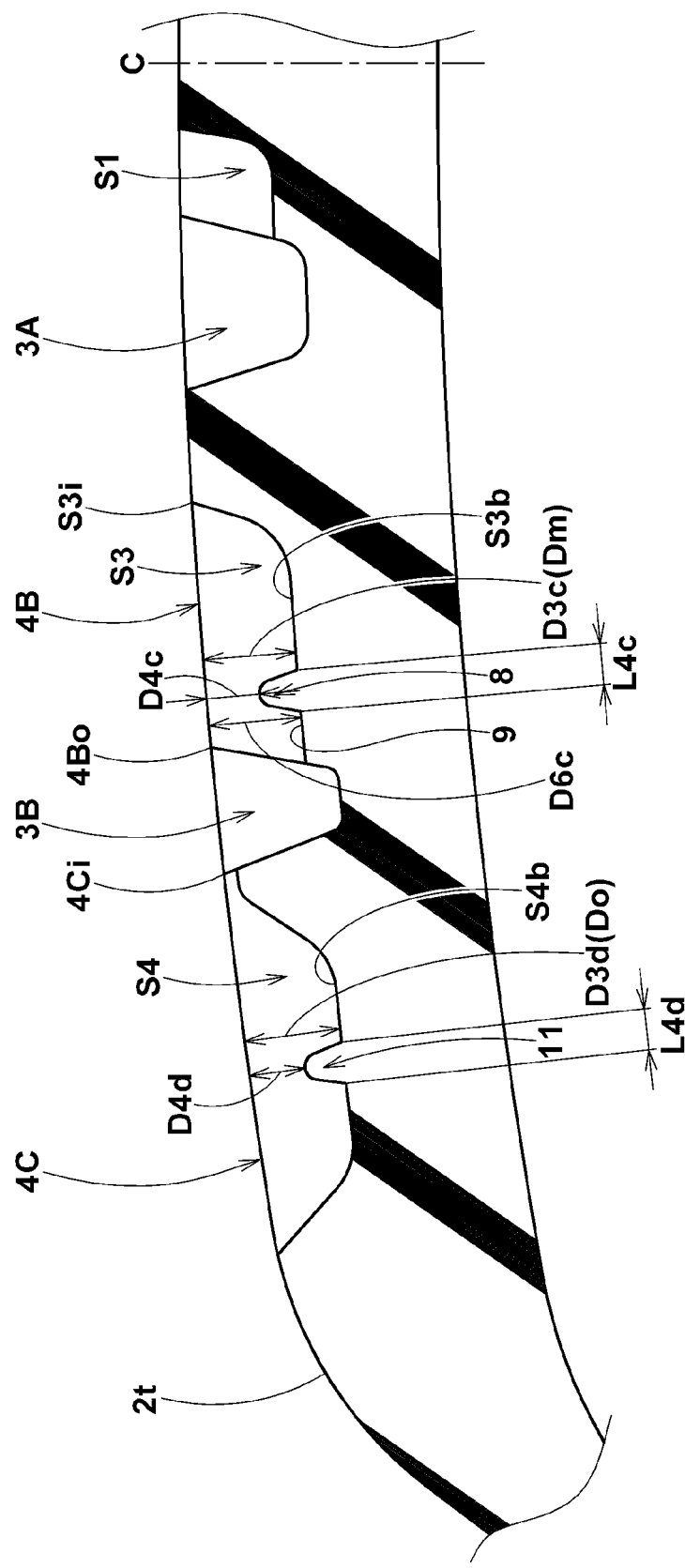
FIG. 3 is an enlarged partial cross sectional view of the tread portion.
Figure 4:
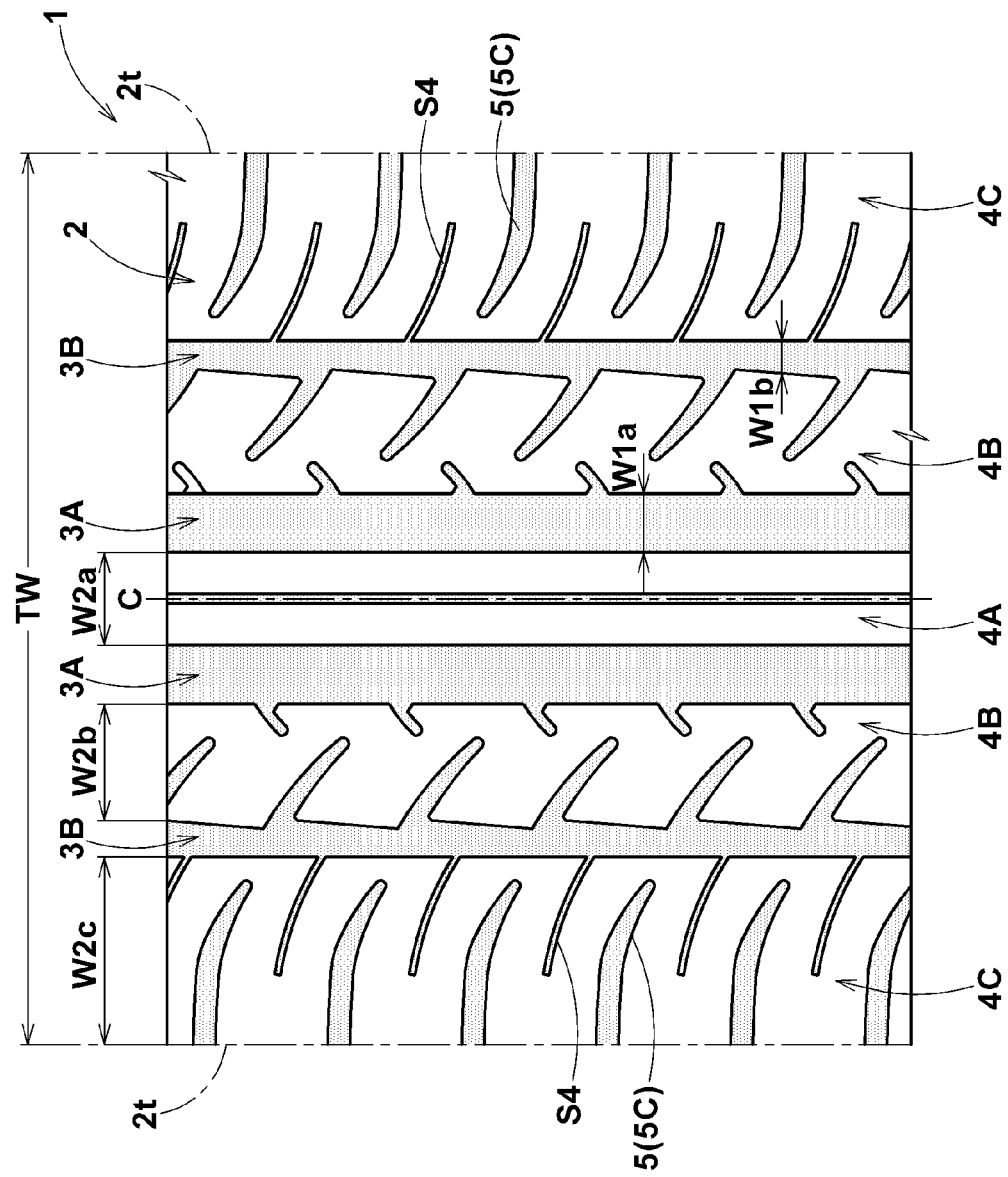
FIG. 4 shows a tread pattern of a pneumatic tire used as a comparative example.

As shown in FIG. 3, the axially outer middle sipes S3 each have a depth D3c gradually increasing from the inner end S3i toward the axially outside to form a maximum depth Dm. Each of the axially outer middle sipes S3 is provided in the vicinity of the shoulder main groove 3B with a shallow portion 8 protruding radially outwardly from the bottom S3b of the axially outer middle sipe S3 and is shallower than the maximum depth Dm. The shallow portions 8 can increase the rigidity of the middle rib 4B in an axially outer edge 4B side which is subjected to a relatively large ground-contact pressure during cornering, thereby improving uneven wear resistance. Here, the vicinity of the shoulder main groove 3B is a region between the outer edge 4Bo of the middle rib 4B and a position axially inward from the outer edge 4Bo by a distance of 30% of the axial width W2b of the middle rib 4B.

To make the foregoing functions more effective, the shallow portion 8 preferably has a depth D4c of from 50 to 65% of the maximum depth Dm of the axially outer middle sipe S3. If the depth D4c exceeds 65% of the maximum depth Dm, the shallow portions 8 may not sufficiently exert the foregoing actions. In contrast, if the depth D4c is less than 50% of the maximum depth Dm, the shallow portions 8 may not sufficiently absorb water existing between the middle ribs 4B and the road surface.

From this point of view, the depth D4c is more preferably 62% or less and 53% or more of the maximum depth Dm. From the same point of view, the length L4c of the shallow portion 8 measured along the axially outer middle sipe S3 is preferably 10% or more, more preferably 12% or more, and 20% or less, more preferably 18% or less of the width W2b of the middle ribs.

Provided between the shallow portion 8 and the shoulder main groove 3B is a communicating portion 9 that is deeper than the shallow portion 8. The communicating portion 9 can maintain the water-absorbing function of the middle rib 4B in an outer edge side that is liable to be deteriorated due to the presence of the shallow portions 8, thereby improving drainage performance. To make the foregoing functions more effective, preferably the communicating portions 9 each have a maximum depth D6c that is 1.5 to 2.0 times the depth D4c of the shallow portions 8.

If the maximum depth D6c is less than 1.5 times the depth D4c, the communicating portions 9 may not sufficiently exert the foregoing actions. If the maximum depth D6c is more than 2.0 times the depth D4c, the communicating portions 9 may not sufficiently maintain the rigidity of the middle rib 4B in an axially outer edge side, thereby resulting in deterioration in the uneven wear resistance.

From this point of view, the maximum depth D6c is more preferably 1.6 times or more, and 1.9 or less times the depth D4c.

As shown in FIG. 1, the shoulder rib 4C is provided with the shoulder sipes S4 extending axially outward from the shoulder main groove 3B and shoulder lug grooves 5C extending axially inward from the tread edge 2t. These shoulder sipes S4 are arranged at intervals in the tire circumferential direction. The shoulder lug grooves 5C are arranged at intervals in the tire circumferential direction.

The shoulder sipes S4 are inclined with respect to the tire circumferential direction, and extend axially outward from the shoulder main groove 3B, and terminate without reaching the tread edge 2t.

Such shoulder sipes S4 can absorb water existing between the shoulder rib 4C and the road surface and serve as edge components while maintaining the rigidity of the shoulder rib 4C, thereby improving the drainage performance and uneven wear resistance.

The shoulder sipes S4 in this embodiment extend axially outward from the shoulder main grooves 3B so as to smoothly and gradually increase their angles α3d with respect to the tire circumferential direction. The shoulder sipes S4 can form axial and circumferential edge components while maintaining rigidity of the shoulder ribs 4C, thereby improving drainage performance and steering stability.

The angle α3d of the shoulder sipe S4 is preferably 40 to 70 degrees. Preferably the shoulder sipes S4 have an axial length L3d of from 50 to 70% of the axial width W2c of the shoulder rib 4C. As shown in FIG. 3, the shoulder sipe S4 has a depth D3d gradually increasing axially outward from its axially inner end S4i to form a maximum depth Do, and has, at an approximately axial center of the shoulder rib 4C, a shallow portion 11 protruding radially outward from the bottom S4b of the shoulder sipe S4 and is shallower than the maximum depth Do. Here, the approximate axial center of the shoulder rib 4C refers to a region between positions one on each side of the widthwise center of the shoulder rib 4C in the tire axial direction at a distance of 30% of the axial width W2c of the shoulder rib 4C. Such shoulder sipes S4 can increase the rigidity of the shoulder rib 4C in its central part and axially inner edge 4Ci part and thereby it is possible to improve uneven wear resistance. To make the foregoing functions more effective, the depth D4d in the shallow portion 11 is preferably 65% or less, more preferably 62% or less and 50% or more, more preferably 53% or more of the maximum depth Do of the shoulder sipe S4. Similarly, an axial length L4d of the shallow portion 11 is preferably 5% or more, more preferably 8% or more, and 18% or less, more preferably 15% or less of the axial width W2c of the shoulder rib 4C.

As shown in FIG. 1, the shoulder lug grooves 5C extend axially inward from the tread edges 2t and terminate within the shoulder ribs 4C without reaching the shoulder main grooves 3B. The angle α5c of each of the shoulder lug grooves 5C with respect to the tire circumferential direction is smoothly and gradually increased from the axially inner end 5Ci of the shoulder lug groove 5C to the tread edge 2t.

Such shoulder lug grooves 5C can smoothly drain water existing between the shoulder ribs 4C and the road surface toward the tread edges 2t, and prevent air flow from the shoulder lug grooves 5C into the shoulder main grooves 3B, thereby improving drainage performance and noise resistance.

The shoulder lug grooves 5C preferably have a groove width W5c of about 2 to 4% of the tread width TW, and a groove depth D5c of about 2 to 5% of the tread width TW, and the angle α5c is preferably about 40 to 80 degrees.

Given that an edge density (T1/W2a) of the crown rib 4A is defined as the total sum (T1) of the axial components of the lengths of one of the leftward crown sipe S1 at one of the edges of the crown rib 4A and one of the rightward crown sipes S1 at the other edge which is divided by the axial width (W2a) of the crown rib 4A, an edge density (T2/W2b) of the middle rib 4B is defined as the total sum (T2) of the axial components of the lengths of one of the axially outer middle sipes S3 and one of the axially inner middle sipes S2 which is divided by the axial width (W2b) of the middle rib 4B, an edge density (T3/W2c) of the shoulder rib 4C is defined as the total sum (T3) of the axial components of the lengths of one of the shoulder sipes S4 and one of the shoulder lug grooves 5C which is divided by the axial width (W2c) of the shoulder rib 4C, the edge density T1/W2a of the crown rib 4A is smallest and the edge density T3/W2c of the shoulder ribs 4C is largest.

Accordingly, the proportions of the sipes and the lug grooves become relatively large in the tread shoulder portions that are liable to deteriorate in the drainage performance due to the narrow shoulder main grooves 3B, which allows effective drainage of water existing between the ribs and the road surface, thereby maintaining drainage performance.

To make the foregoing functions more effective, the edge density T3/W2c of the shoulder ribs 4C is preferably two to three times the edge density T1/W2c of the crown rib 4A. If the edge density T3/W2c is smaller than two times the edge density T1/W2c, the shoulder ribs 4C may not sufficiently exert the foregoing actions. If the edge density T3/W2c is more than three times the edge density T1/W2c, a difference in the rigidity between the crown rib 4A and the shoulder ribs 4C becomes excessively large, which may result in uneven wear. From this point of view, the edge density $T3/W2c$ is more preferably 2.3 or more times, and 2.7 or less times the edge density $T1/W2c$.

As in the foregoing, a particularly preferred embodiment of the present invention is described in detail. However, the present invention is not limited to the embodiment illustrated but may be carried out in various modified manners.

Comparison Tests

Test tire of size 225/50 R17 (Rim size: 17×7.5 J) having specifications shown in Table 1 were manufactured and tested for the drainage performance, noise performance and uneven wear resistance.
Specifications common to all of the test tires are as follows:
Tread width TW: 198 mm
Crown main groove depth D1$a$: 8.5 mm (4.3% of TW)
Shoulder main groove depth D1$b$: 8.5 mm (4.3% of TW)
Crown rib width W2$a$: 21.3 mm
Crown sipes:
    angle α3$a$: 60 degrees
    depth D3$a$: 6.1 mm
    axial length L3$a$: 6.1 mm (28.6% of W2$a$)
Middle rib width W2$b$: 27.5 mm
Axially inner middle sipes:
    angle α3$b$: 40 to 50 degrees
    depth D3$b$: 5.0 mm
    axial distance L3$b$: 21.4 mm (77.8% of W2$b$)
Axially outer middle sipes:
    angle α3$c$: 50 to 60 degrees
    maximum depth Dm: 7.0 mm
    shallow portion length L4$c$: 4.5 mm (16.4% of W2$b$)
Shoulder rib width W2$c$: 38.2 mm
Shoulder sipes:
    angle α3$d$: 50 to 70 degrees
    maximum depth Do: 7.0 mm
    axial length L3$d$: 24.4 mm (63.9% of W2$c$)
    shallow portion length L4$d$: 4.5 mm (11.8% of W2$c$)
Shoulder lug grooves:
    width W5$c$: 5.5 mm (2.8% of TW)
    depth D5$c$: 6.1 mm (3.1% of TW)
    angle α5$c$: 50 to 80 degrees Drainage Performance (Aquaplane Resistance) Test A test car (Japanese 3500 cc passenger car) provided on all four wheels with test tires (inflated to 240 kPa) was run along a 100 meter radius circle on an asphalt road partially provided with a 10 mm depth 20 m long water pool, and the lateral acceleration (lateral G) during running in the water pool was measured, gradually increasing the speed entering into the water pool. The maximum lateral acceleration (lateral G) and the speed at which the maximum lateral acceleration was occurred were measured in a speed range of from 50 to 80 km/h. The results are indicated in Table 1 by an index based on Ref. 1 being 100, wherein the larger is better.

Noise Performance (Pass-By Noise) Test

The pass-by noise of the test car coasted at a speed of 53 km/h was measured according to the "Test Procedure for Tire Noise" specified in Japanese JASO-C606. The test results are indicated in Table 1 by an index based on Ref. 1 being 100, wherein the larger is better.

Wear Resistance Test

Using a computer simulation method, wear of the tread portion was simulated and the tread wear life was estimated. The results are indicated in Table 1 by an index based on Ref. 1 being 100, wherein the larger is better.

As the results of the tests, it has been confirmed that the tires in the examples can improve drainage performance while maintaining wear resistance and noise performance.

TABLE 1

| Tire | Ref. 1 | Ref. 2 | Ex. 1 | Ex. 2 | Ex. 3 | Ref. 3 | Ref. 4 | Ex. 4 |
| --- | --- | --- | --- | --- | --- | --- | --- | --- |
| Tread pattern (Fig. No.) | 4 | 1 | 1 | 1 | 1 | 1 | 1 | 1 |
| Crown main groove width W1a (mm) | 10.5 | 9.9 | 10.9 | 11.8 | 14.9 | 15.8 | 11.8 | 11.8 |
| W1a/TW (%) | 5.3 | 5.0 | 5.5 | 6.0 | 7.5 | 8.0 | 6.0 | 6.0 |
| Shoulder main groove width W1b (mm) | 8.0 | 5.9 | 6.5 | 7.6 | 8.9 | 9.4 | 5.1 | 6.4 |
| W1b/W1a (%) | 76.2 | 59.6 | 59.6 | 64.4 | 59.7 | 59.5 | 43.2 | 54.2 |
| Sum of axial components of lengths | | | | | | | | |
| crown rib T1 (mm) | 12.2 | 12.2 | 12.2 | 12.2 | 12.2 | 12.2 | 12.2 | 12.2 |
| middle rib T2 (mm) | 30.5 | 30.5 | 30.5 | 30.5 | 30.5 | 30.5 | 30.5 | 30.5 |
| shoulder rib T3 (mm) | 58.0 | 58.0 | 58.0 | 58.0 | 58.0 | 58.0 | 58.0 | 58.0 |
| Edge density | | | | | | | | |
| crown rib (T1/W2a) (%) | 57.3 | 57.3 | 57.3 | 57.3 | 57.3 | 57.3 | 57.3 | 57.3 |
| middle rib (T2/W2b) (%) | 110.9 | 110.9 | 110.9 | 110.9 | 110.9 | 110.9 | 110.9 | 110.9 |
| shoulder rib (T3/W2c) (%) | 151.8 | 151.8 | 151.8 | 151.8 | 151.8 | 151.8 | 151.8 | 151.8 |
| (T3/W2c)/(T1/W2a) | 2.7 | 2.7 | 2.7 | 2.7 | 2.7 | 2.7 | 2.7 | 2.7 |
| Axially outer middle sipe | | | | | | | | |
| distance L3c (mm) | — | 6.1 | 6.1 | 6.1 | 6.1 | 6.1 | 6.1 | 6.1 |
| L3c/W2b (%) | — | 22.2 | 22.2 | 22.2 | 22.2 | 22.2 | 22.2 | 22.2 |
| shallow portion | — | | | | | | | |
| depth D4c (mm) | — | 4.0 | 4.0 | 4.0 | 4.0 | 4.0 | 4.0 | 4.0 |
| D4c/Dm (%) | — | 57.1 | 57.1 | 57.1 | 57.1 | 57.1 | 57.1 | 57.1 |
| maximum depth D6c (mm) | — | 7.0 | 7.0 | 7.0 | 7.0 | 7.0 | 7.0 | 7.0 |
| D6c/D4c | — | 1.8 | 1.8 | 1.8 | 1.8 | 1.8 | 1.8 | 1.8 |
| Shoulder sipe shallow portion | — | | | | | | | |
| depth D4d (mm) | — | 4.0 | 4.0 | 4.0 | 4.0 | 4.0 | 4.0 | 4.0 |
| D4d/Do (%) | — | 57.1 | 57.1 | 57.1 | 57.1 | 57.1 | 57.1 | 57.1 |
| Drainage | 100 | 102 | 103 | 105 | 105 | 110 | 103 | 104 |
| Noise performance | 100 | 100 | 100 | 100 | 95 | 90 | 95 | 100 |

TABLE 1-continued

| | | | | | | | | |
|---|---|---|---|---|---|---|---|---|
| Wear resistance | 100 | 102 | 103 | 105 | 105 | 90 | 95 | 100 |
| Tire | Ex. 5 | Ref. 5 | Ex. 6 | Ex. 7 | Ex. 8 | Ex. 9 | Ex. 10 | Ex. 11 |
| Tread pattern (Fig. No.) | 1 | 1 | 1 | 1 | 1 | 1 | 1 | 1 |
| Crown main groove width W1a (mm) | 11.8 | 11.8 | 11.8 | 11.8 | 11.8 | 11.8 | 11.8 | 11.8 |
| W1a/TW (%) | 6.0 | 6.0 | 6.0 | 6.0 | 6.0 | 6.0 | 6.0 | 6.0 |
| Shoulder main groove width W1b (mm) | 9.0 | 10.2 | 7.6 | 7.6 | 7.6 | 7.6 | 7.6 | 7.6 |
| W1b/W1a (%) | 76.3 | 86.4 | 64.4 | 64.4 | 64.4 | 64.4 | 64.4 | 64.4 |
| Sum of axial components of lengths | | | | | | | | |
| crown rib T1 (mm) | 12.2 | 12.2 | 12.2 | 16.1 | 12.2 | 12.2 | 12.2 | 12.2 |
| middle rib T2 (mm) | 30.5 | 30.5 | 30.5 | 30.5 | 30.5 | 30.5 | 30.5 | 30.5 |
| shoulder rib T3 (mm) | 58.0 | 58.0 | 38.2 | 58.0 | 65.7 | 58.0 | 58.0 | 58.0 |
| Edge density | | | | | | | | |
| crown rib (T1/W2a) (%) | 57.3 | 57.3 | 57.3 | 75.6 | 57.3 | 57.3 | 57.3 | 57.3 |
| middle rib (T2/W2b) (%) | 110.9 | 110.9 | 110.9 | 110.9 | 110.9 | 110.9 | 110.9 | 110.9 |
| shoulder rib (T3/W2c) (%) | 151.8 | 151.8 | 100.0 | 151.8 | 172.0 | 151.8 | 151.8 | 151.8 |
| (T3/W2c)/(T1/W2a) | 2.7 | 2.7 | 1.7 | 2.0 | 3.0 | 2.7 | 2.7 | 2.7 |
| Axially outer middle sipe | | | | | | | | |
| distance L3c (mm) | 6.1 | 6.1 | 6.1 | 6.1 | 6.1 | 2.8 | 11.0 | 6.1 |
| L3c/W2b (%) | 22.2 | 22.2 | 22.2 | 22.2 | 22.2 | 10.2 | 40.0 | 22.2 |
| shallow portion | | | | | | | | none |
| depth D4c (mm) | 4.0 | 4.0 | 4.0 | 4.0 | 4.0 | 4.0 | 4.0 | — |
| D4c/Dm (%) | 57.1 | 57.1 | 57.1 | 57.1 | 57.1 | 57.1 | 57.1 | — |
| maximum depth D6c (mm) | 7.0 | 7.0 | 7.0 | 7.0 | 7.0 | 7.0 | 7.0 | — |
| D6c/D4c | 1.8 | 1.8 | 1.8 | 1.8 | 1.8 | 1.8 | 1.8 | — |
| Shoulder sipe shallow portion | | | | | | | | |
| depth D4d (mm) | 4.0 | 4.0 | 4.0 | 4.0 | 4.0 | 4.0 | 4.0 | 4.0 |
| D4d/Do (%) | 57.1 | 57.1 | 57.1 | 57.1 | 57.1 | 57.1 | 57.1 | 57.1 |
| Drainage | 105 | 105 | 103 | 102 | 105 | 105 | 103 | 105 |
| Noise performance | 98 | 95 | 100 | 100 | 100 | 100 | 100 | 100 |
| Wear resistance | 100 | 98 | 105 | 105 | 100 | 100 | 105 | 103 |

| | | | | | | | |
|---|---|---|---|---|---|---|---|
| Tire | Ex. 12 | Ex. 13 | Ex. 14 | Ex. 15 | Ex. 16 | Ex. 17 | Ex. 18 |
| Tread pattern (Fig. No.) | 1 | 1 | 1 | 1 | 1 | 1 | 1 |
| Crown main groove width W1a (mm) | 11.8 | 11.8 | 11.8 | 11.8 | 11.8 | 11.8 | 11.8 |
| W1a/TW (%) | 6.0 | 6.0 | 6.0 | 6.0 | 6.0 | 6.0 | 6.0 |
| Shoulder main groove width W1b (mm) | 7.6 | 7.6 | 7.6 | 7.6 | 7.6 | 7.6 | 7.6 |
| W1b/W1a (%) | 64.4 | 64.4 | 64.4 | 64.4 | 64.4 | 64.4 | 64.4 |
| Sum of axial components of lengths | | | | | | | |
| crown rib T1 (mm) | 12.2 | 12.2 | 12.2 | 12.2 | 12.2 | 12.2 | 12.2 |
| middle rib T2 (mm) | 30.5 | 30.5 | 30.5 | 30.5 | 30.5 | 30.5 | 30.5 |
| shoulder rib T3 (mm) | 58.0 | 58.0 | 58.0 | 58.0 | 58.0 | 58.0 | 58.0 |
| Edge density | | | | | | | |
| crown rib (T1/W2a) (%) | 57.3 | 57.3 | 57.3 | 57.3 | 57.3 | 57.3 | 57.3 |
| middle rib (T2/W2b) (%) | 110.9 | 110.9 | 110.9 | 110.9 | 110.9 | 110.9 | 110.9 |
| shoulder rib (T3/W2c) (%) | 151.8 | 151.8 | 151.8 | 151.8 | 151.8 | 151.8 | 151.8 |
| (T3/W2c)/(T1/W2a) | 2.7 | 2.7 | 2.7 | 2.7 | 2.7 | 2.7 | 2.7 |
| Axially outer middle sipe | | | | | | | |
| distance L3c (mm) | 6.1 | 6.1 | 6.1 | 6.1 | 6.1 | 6.1 | 6.1 |
| L3c/W2b (%) | 22.2 | 22.2 | 22.2 | 22.2 | 22.2 | 22.2 | 22.2 |
| shallow portion | | | | | | | |
| depth D4c (mm) | 3.5 | 4.6 | 4.0 | 4.0 | 4.0 | 4.0 | 4.0 |
| D4c/Dm (%) | 50.0 | 65.7 | 57.1 | 57.1 | 57.1 | 57.1 | 57.1 |
| maximum depth D6c (mm) | 6.1 | 8.1 | 6.0 | 8.0 | 7.0 | 7.0 | 7.0 |
| D6c/D4c | 1.7 | 1.8 | 1.5 | 2.0 | 1.8 | 1.8 | 1.8 |
| Shoulder sipe shallow portion | | | | | none | | |
| depth D4d (mm) | 4.0 | 4.0 | 4.0 | 4.0 | — | 3.5 | 4.6 |
| D4d/Do (%) | 57.1 | 57.1 | 57.1 | 57.1 | — | 50.0 | 65.7 |
| Drainage | 103 | 105 | 102 | 105 | 105 | 103 | 105 |
| Noise performance | 100 | 100 | 100 | 100 | 100 | 100 | 100 |
| Wear resistance | 105 | 104 | 105 | 103 | 103 | 105 | 103 |

The invention claimed is:

1. A pneumatic tire comprising
a tread portion provided on each side of the tire equator with an axially inner crown main groove and an axially outer shoulder main groove each extending continuously in the tire circumferential direction so as to axially divide the tread portion into a crown rib between the crown main grooves, a pair of middle ribs between the crown main grooves and the shoulder main grooves, and a pair of shoulder ribs between the shoulder main grooves and tread edges, wherein
the crown main grooves have a width of from 5.5 to 7.5% of a tread width between the tread edges,
the shoulder main grooves have a width of from 50 to 70% of the width of the crown main grooves, the crown rib is provided with leftward crown sipes which are defined as extending from one of the crown main grooves toward the tire equator, and rightward crown sipes which are defined as extending from the other crown main groove toward the tire equator, the middle ribs are each provided with axially inner middle sipes and axially outer middle sipes, the axially inner middle sipes extending axially outward from the adjacent crown main groove and terminating within the middle rib, and the axially outer middle sipes extending axially inward from the adjacent shoulder main groove and terminating within the middle rib, the shoulder ribs are each provided with shoulder sipes and shoulder lug grooves, the shoulder sipes extending axially outward from the adjacent shoulder main groove, and the shoulder lug grooves extending axially inward from the tread edge and terminating within the shoulder rib, and only connected with the crown main grooves and the shoulder main grooves are the leftward and rightward crown sipes, the axially inner and axially outer middle sipes and the shoulder sipes wherein
in each of the middle ribs, each of the axially outer middle sipes has its axially inner end at an axial distance of from 10 to 40% of the axial width of the middle rib, from the adjacent crown main groove, and toward the axially outside from said axially inner end, the depth of the axially outer middle sipe is gradually increased to form a deepest portion having a maximum depth, then the depth is decreased to form a shallow portion of which depth is less than the maximum depth, and again the depth is increased to form a communicating portion continued to the shoulder main groove and being deeper than the shallow portion.

2. The pneumatic tire according to claim 1, wherein when an edge density of the crown rib is defined as the total sum of the axial components of the lengths of one of the leftward crown sipes and one of the rightward crown sipes which is divided by the axial width of the crown rib, an edge density of each middle rib is defined as the total sum of the axial components of the lengths of one of the axially inner middle sipes and one of the axially outer middle sipes which is divided by the axial width of the middle rib, and an edge density of each shoulder rib is defined as the total sum of the axial components of the lengths of one of the shoulder sipes and one of the lug grooves which is divided by the axial width of the shoulder rib, the edge density of the crown rib is smallest and the edge density of the shoulder rib is largest.

3. The pneumatic tire according to claim 1, wherein the axially inner middle sipes are inclined at an angle of from 40 to 70 degrees with respect to the tire circumferential direction, and the axially outer middle sipes are inclined at an angle of from 40 to 70 degrees with respect to the tire circumferential direction.

4. The pneumatic tire according to claim 2, wherein the axially inner middle sipes are inclined at an angle of from 40 to 70 degrees with respect to the tire circumferential direction, and the axially outer middle sipes are inclined at an angle of from 40 to 70 degrees with respect to the tire circumferential direction.

\* \* \* \* \*